Figure 1:
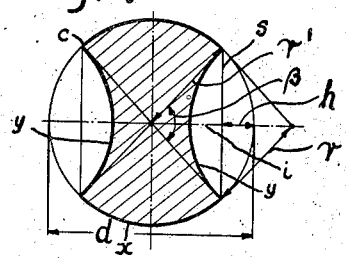

July 12, 1938.                H. GRIFFEL                2,123,239
           REINFORCING MEMBER FOR REINFORCED CONCRETE STRUCTURES
                           Filed April 27, 1936

Patented July 12, 1938

2,123,239

UNITED STATES PATENT OFFICE 2,123,239

REINFORCING MEMBER FOR REINFORCED CONCRETE STRUCTURES

Henryk Griffel, Katowice, Poland

Application April 27, 1936, Serial No. 76,499
In Poland October 21, 1935

4 Claims. (Cl. 72—111)

Applications have been filed in Poland on October 21, 1935 and December 14, 1935 and in Germany on November 14, 1935 and December 16, 1935.

This invention relates to an improved reinforcing member for reinforced concrete structures.

Steel reinforcing members are already known which have other than circular cross sections and the dimensions of which, compared with circular reinforcing members, are smaller the greater is the allowable tensile stress in relation to the tensile stress of the round cross section of normal strength. None of the known cross sections of steel reinforcements can, however, be exchanged for a definite corresponding circular reinforcement without further calculations or alteration of plan, as such an exchange will only be possible under the condition that not only is the cross sectional dimension in relation to the increased allowable stress smaller, but also the circumference of the cross section is as large as, or larger, for the purpose of producing the necessary tenacity, than in the case of the corresponding circular reinforcement.

The present invention has for its object the production of cross sections of reinforcing bars consisting of high value steel of high yield point which are of other than circular form and which are exchangeable for corresponding definite circular metal bars of normal strength without any further manipulation such as calculation or alteration of plan.

According to this invention, I provide a non-circular reinforcing member for reinforced concrete structures made of high value steel of high yield point having a cross section which is derived from the cross section of a circle which corresponds to the cross section of a normal circular iron reinforcement and which is produced by removing two opposite lens-like segments of the circle by arcs of the same radius as, or smaller radius than, that of the circle such that the area of this cross section is smaller in the desired proportion to the area of the whole circle, but its periphery is at least equal to or greater than the periphery of this circle, whereby a reinforcing member adapted for higher allowable stresses is produced which is exchangeable directly, that is without any further calculation or alteration of plan, for the corresponding circular reinforcing member.

The radius of the concave faces may, if desired, be the same as the radius of the corresponding circular reinforcing member.

In order that the tenacity of the new reinforcing members may not be smaller than that of normal circular rods, according to the invention, all sharp edges of the respective cross-sections may be considerably rounded. Finally the cross-sections of the novel reinforcing members are in appearance so different from the circular cross-sections of the normal reinforcing members that they can be distinguished from the latter at a glance. Consequently, erroneous use of the dearer reinforcing members with high strength values instead of the normal circular reinforcements is safely avoided. The new reinforcing members can also be provided with transverse ribs for the purpose of producing still greater tenacity or adhesion with respect to the concrete. For this purpose also the rod can be twisted around its longitudinal axis.

Finally, it must be stressed that the new reinforcing members exhibit essentially the following advantages in comparison with the known steel reinforcements consisting of two machine-turned circular rods ("Isteg" system): The new reinforcing members are not, like the "Isteg" rods, practicable only with larger cross-sections, but they can have the smallest cross-section; they can, on account of the lack of a special thermal treatment, be connected together by welding, and finally there is with them no danger of a separation of the concrete under great loads, as is actually the case with the "Isteg" rods.

In the accompanying drawing is shown, by way of example, in Figures 1–6, embodiments of steel reinforcing members formed with a cross-section in accordance with the invention, together with the pertaining normal steel reinforcing members of circular cross section.

In the figures $r$=the radius of the convex curve and $r_1$ the radius of the concave curve of the periphery of the reinforcement, $d$=diameter of the chosen circular cross-section and $s$=the chord of the arc.

Referring to the drawing, Figure 1 shows a steel reinforcing member with $K_z$=1800 kg./cm.² having two convex faces $x$, $x$ and two concave faces $y$, $y$. The member is distinguished by the simplicity of manufacture by means of rollers and in use by the shape simplifying bending and stacking. It will be seen that the greatest diameter $c$ of the member corresponds exactly with the diameter $d$ of the normal circular reinforcements having $K_z$=1200 kg./cm.² The periphery of the member, moreover, is the same as the circumference of the circular member but the area is, of course, less. The distance $i$ of the concave faces is equal to the distance $h$ so that $r_1=r$. The cross-section according to Figure 2 differs from that according to Figure 1 principally only by the rounding of the edges of the radius $r_2$.

In Figure 1 $h=0.1387\ d$ and the angle $\beta=87°\ 14'$.

Figure 2:
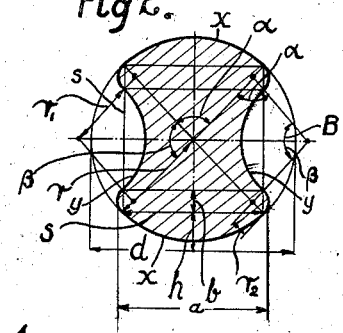

In Figure 2 $r_1=0.37\ d$, $r_2=0.065\ d$, $h=0.1255\ d$, $s=0.6626\ d$, $b=0.0974\ d$, $a=0.7064\ d$, the angle $\alpha=83°$ and the angle $\beta=97°$.

In all cases the sizes of the cross-sections formed according to the invention relative to the permissible tensile strain $K_z$ correspond to the pertaining circular cross-sections illustrated; the peripheries are at least equal to the circumference of the respective circular cross-section, which is advantageous from the point of view of tenacity.

Figure 3:
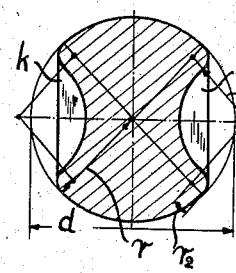
Figure 4:
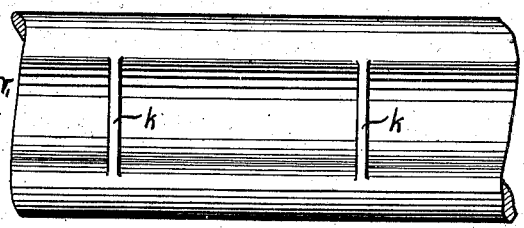

In cases where a particularly great tenacity or adhesion is desired between the reinforcing member and the concrete surrounding it, the members, formed according to the invention, can be made with transverse ribs projecting from the cross-section and lying against the concrete. One embodiment of such a ribbed rod is shown in Figures 3 and 4. The cross-sectional form in Figure 3 corresponds to that in Figure 2. Between the cross section projections are arranged ribs $k$; the spacing can be chosen dependent on the diameter $d$, amounting in many cases to 1.5 $d$ to 2 $d$. The size of the ribs $k$ can be variously chosen. Obviously the invention is not limited to the form of rib shown in Figures 3 and 4.

Figure 5:
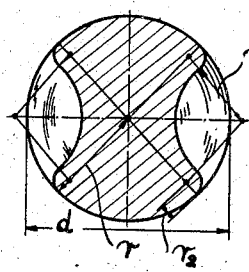
Figure 6:
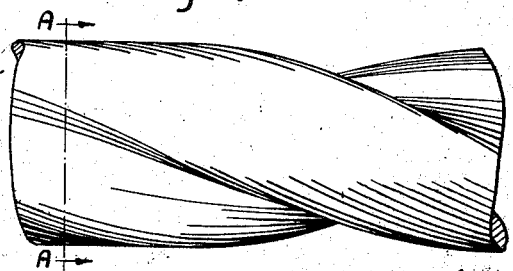

Again, if a considerable tenacity is desired, the steel reinforcing members can be twisted about their longitudinal axis. Such a twisted reinforcing member is illustrated in Figures 5 and 6, Fig. 5 being a cross-section on the line A—A of Figure 6 and Fig. 6 being a side elevation of the reinforcing member. Such a twisting of the steel reinforcing member produces a considerable increase in the tenacity of the upper surface of the reinforcing member.

I claim:

1. A reinforcing member for reinforced concrete structures made of high value steel of high yield point having an approximate circular cross section with two opposite portions thereof of concave shape formed by removing two opposite lens-like segments of the same radius as that of the circular section, the periphery of the said cross section being at least equal to the periphery of said circle, whereby a reinforcing member adapted for high allowable stresses is produced which is exchangeable directly, that is without any further calculation or alteration of plan, for the corresponding circular reinforcing member.

2. A reinforcing member for reinforced concrete structures made of high value steel of high yield point having an approximate circular cross section with two opposite portions thereof of concave shape formed by removing two opposite lens-like segments of the same radius as that of the circular section, the junction of adjacent surfaces being rounded, the periphery of the said cross section being at least equal to the periphery of said circle, whereby a reinforcing member adapted for high allowable stresses is produced which is exchangeable directly, that is without any further calculation or alteration of plan, for the corresponding circular reinforcing member.

3. A reinforcing member for reinforced concrete structures made of high value steel of high yield point having an approximate circular cross section with two opposite portions thereof of concave shape formed by removing two opposite lens-like segments of the same radius as that of the circular section, the periphery of the said cross section being at least equal to the periphery of said circle and said member being twisted around its axis, whereby a reinforcing member adapted for high allowable stresses is produced which is exchangeable directly, that is without any further calculation or alteration of plan, for the corresponding circular reinforcing member.

4. A reinforcement for reinforced concrete structures comprising a reinforcing member made of high value steel of high yield point, said member having an approximate circular cross section with two opposite portions thereof of concave shape formed by removing two opposite lens-like segments of the same radius as that of the circular section, the periphery of the said cross section being at least equal to the periphery of said circle and spaced transverse ribs on said concave portions, whereby a reinforcing member adapted for high allowable stresses is produced which is exchangeable directly, that is without any further calculation or alteration of plan, for the corresponding circular reinforcing member.

HENRYK GRIFFEL.